(12) United States Patent
Dilkie

(10) Patent No.: US 8,744,083 B2
(45) Date of Patent: *Jun. 3, 2014

(54) SYSTEM AND METHOD FOR EARLY CUT THROUGH OF ENCRYPTED AND UNENCRYPTED VOICE STREAMS

(75) Inventor: Lee Dilkie, Stittsville (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/538,616

(22) Filed: Jun. 29, 2012

(65) Prior Publication Data

US 2014/0003607 A1 Jan. 2, 2014

(51) Int. Cl.
*H04K 1/00* (2006.01)

(52) U.S. Cl.
USPC ............. 380/270; 380/42; 380/255; 380/275; 370/395.2; 370/395.21; 704/273; 713/152; 713/164

(58) Field of Classification Search
None
See application file for complete search history.

(56) References Cited

U.S. PATENT DOCUMENTS

| | | | | |
|---|---|---|---|---|
| 5,070,528 A * | 12/1991 | Hawe et al. | .................... | 713/161 |
| 5,185,796 A * | 2/1993 | Wilson | .......................... | 380/277 |
| 6,341,164 B1 * | 1/2002 | Dilkie et al. | .................. | 380/278 |
| 6,865,681 B2 * | 3/2005 | Nuutinen | ........................ | 726/14 |
| 7,266,703 B2 * | 9/2007 | Anand et al. | .................. | 713/189 |
| 7,480,284 B2 * | 1/2009 | Wengrovitz et al. | .......... | 370/352 |
| 7,747,013 B2 * | 6/2010 | Deans et al. | .................... | 380/42 |
| 2010/0211787 A1 * | 8/2010 | Bukshpun et al. | ............ | 713/170 |

* cited by examiner

*Primary Examiner* — Saleh Najjar
*Assistant Examiner* — Jason Plotkin

(57) ABSTRACT

VoIP systems often use multiple ciphers for different components. The present invention includes a system and method for early detection of encrypted signals in packet networks that may be encrypted using any of a multitude of ciphers.

18 Claims, 4 Drawing Sheets

TO FIGURE 3B

SYSTEM AND METHOD FOR EARLY CUT THROUGH OF ENCRYPTED AND UNENCRYPTED VOICE STREAMS

FIELD OF INVENTION

The present invention relates generally to detection of encrypted signals within a communication system. More particularly, the present invention provides a system and method of early cut through of encrypted and unencrypted voice or media streams by testing for multiple ciphers if a first tested cipher is not detected.

BACKGROUND

Advances within Internet technologies have spawned new mechanisms of data, voice, and video communication including Internet Protocol (IP) telephony, which is a quickly developing field of telecommunications. However, the Internet is faced with two significant obstacles to fast, yet secure, communications. The first obstacle is usable bandwidth. Bandwidth affects the rate at which data can be transferred. The second obstacle pertains to security. The Internet does not provide a direct point-to-point connection between computers. Rather, it is a global system of interconnected computer networks that use the standard Internet protocol suite (often called TCP/IP, although not all applications use TCP) for the purpose of communicating between computers or other IP devices. As such, there is increased opportunity for eavesdropping on data, voice, or video transmissions over the Internet. Voice security is particularly desirable for VoIP connections over an IP network.

U.S. Pat. No. 7,747,013 by Dilkie et al. and assigned to Mitel Networks Corporation (referred to hereinafter as the '013 patent), addresses security issues with respect to VoIP telephone calls. Typically, a call signaling channel is secured by using a Transport Layer Security (TLS), a Secure Sockets Layer (SSL), or an IP Security Protocol (IPSec) on a secure well-known port. These approaches, however, suffer from delays in call setup time, complex handshaking procedures, and significant protocol overhead. In particular, in order to properly advise both endpoints in a communication system as to how to encrypt a voice packet, media signaling must carry the appropriate security information for negotiation requirements. Unfortunately, the delay of the signaling path relative to established voice path can result in some undesirable side effects.

Also, some VoIP implementations do not prevent signaling information from being viewed by unscrupulous computer hackers on the IP network used for VoIP calls. In some instances, when a SETUP message is sent over the IP network, the calling name and calling number is visible to sniffers or other such tools used on the Internet. To overcome this, voice packets are encrypted at a source and decrypted at the destination in order that a third party cannot eavesdrop on the conversation.

Therefore, the '013 patent sets forth an early detection system and method for encrypted signals in packet networks to address the race condition that can be created between simultaneous media and security negotiation. Typically the media path negotiation finishes first while the security negotiation may take several hundred milliseconds longer. This is especially true when security has to be negotiated though several network devices such as session border gateways, switches etc. The delay in completing the security negotiation can cause a significant and noticeable delay in the cut through of voice or other media streams on the negotiated connection. This delay is at the very least inconvenient and in some cases unacceptable to users.

According to the '013 patent, a transmitter places an indication in the first portion (one or a few packets) of the voice or media stream that is used by a cooperating receiver to determine if the stream is either unencrypted or uses a single type of encryption cipher. The receiver determines: a) whether the stream comes from a cooperating sender and whether it is unencrypted or encrypted in the expected format (i.e. using the expected cipher). Thus, the receiver disclosed in the '013 patent can provide early cut through in a network that contains both cooperating and non-cooperating transmitters while eliminating the risk of unacceptable audio and delay.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
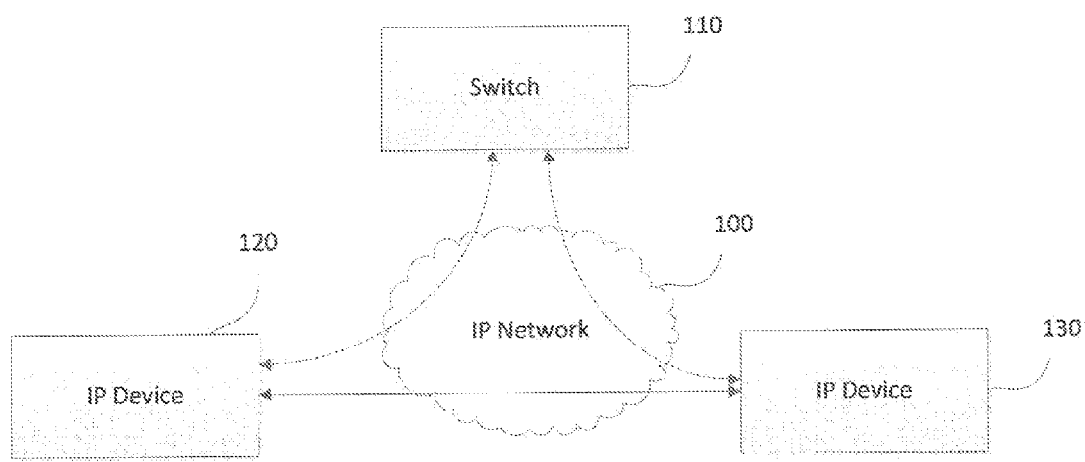
FIG. 1 shows a typical VoIP system with a signaling path and an established voice path between two IP telephony devices.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

THE INVENTION

The system and method set forth in the '013 patent refers to the use of only one cipher. However, VoIP systems often use multiple ciphers for different components. As discussed in greater detail below, according to the present invention a system and method are provided for early detection of encrypted signals in packet networks that may be encrypted using any of a multitude of ciphers. In one embodiment, a quick test process is also provided to discriminate between ciphers or classes of ciphers.

In FIG. 1, a typical VoIP system is shown including an Internet Protocol Network 100 providing a signaling path (dashed lines) shown relative to an established voice path (solid lines) between two IP telephony devices 120 and 130. A switch 110 creates and tears down VoIP connections between the devices 120 and 130 in a known manner. VoIP systems such as that shown in FIG. 1 are susceptible to noise and voice clipping. Noise occurs when the receiving IP device receives a real time transport protocol (RTP) packet from the sending IP device before the signaling is sent by the switch 110 and expects to decipher it based on a "best guess" of the encrypting cipher, but receives instead packets based on a different cipher, or no encryption, commonly referred to as a NULL cipher. Voice clipping may occur because the receiver may not play any RTP packets until final signaling negotiation, in which case initial packets are dropped. Typically, the receiving IP device must wait for the final confirmation of the negotiated capabilities of the endpoints before accepting the voice stream packets. On the other hand, if the receiving IP device does not wait for the confirmation, loud "noise" may be played out when the capabilities of the transmitter and receiver do not match.

Figure 2:
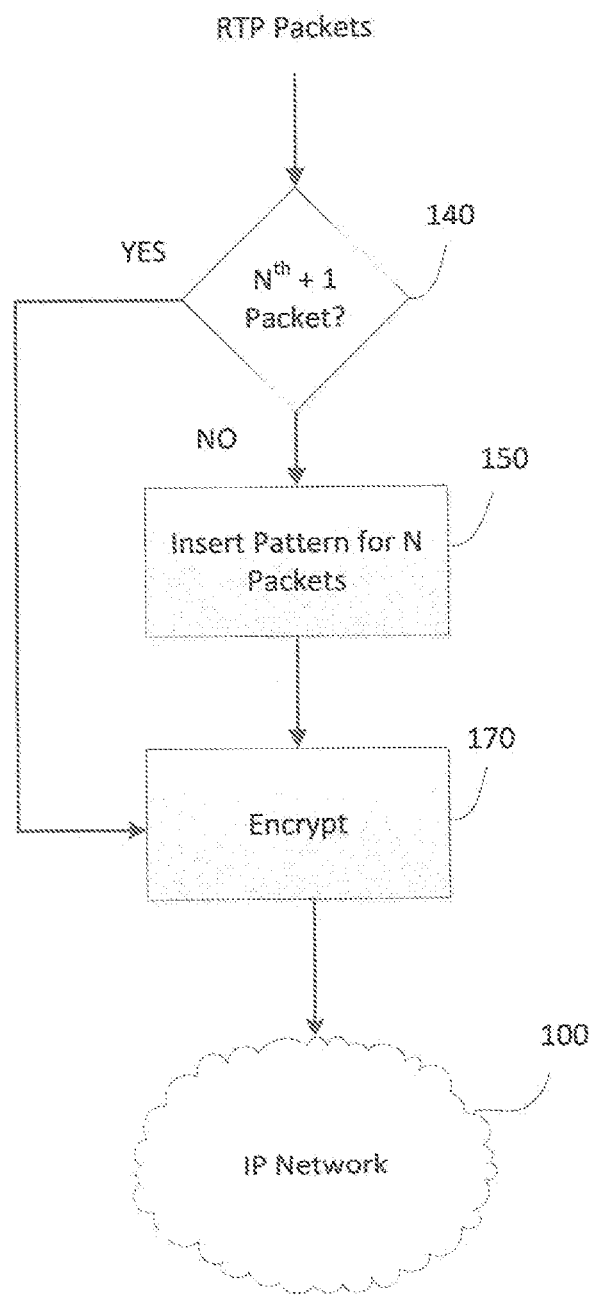
FIG. 2 is a flow diagram showing steps in transmitting a voice or media stream in accordance with a preferred embodiment of the present invention.

As discussed above, the '013 patent provides a solution to the foregoing problems of noise and voice clipping, but only for an encrypted RTP stream that has been encoded using a single "best guess" cipher FIG. 2 shows showing steps in transmitting a voice or media stream in accordance a preferred embodiment of the present invention At the start of the call, the first N (where N is an integer) packets are modified at the transmitting IP device (hereinafter "the transmitter") with a specific pattern. This is shown at step 150 in FIG. 2, following which the packets are encrypted at step 170. After the Nth packet (step 140), the pattern insertion step 150 is bypassed. The inserted pattern is used at the receiver end to indicate matching capabilities and is discussed in further detail below.

FIG. 3 shows the methodology used at the receiver end, according to the present invention, if the first delivered packet(s) arrive(s) before the signaling message.

Figure 3A:
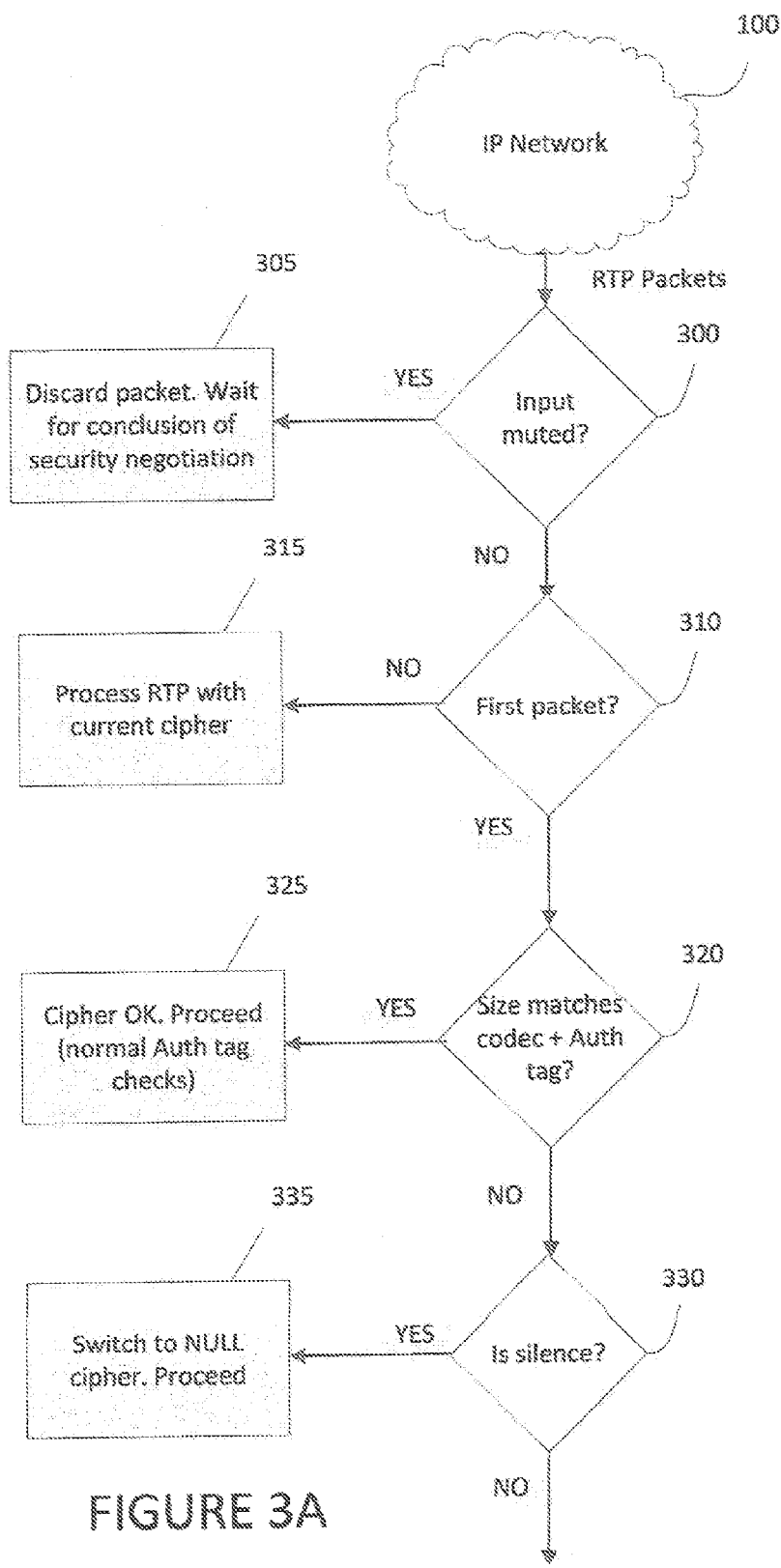
FIG. 3 comprises FIGS. 3A and 3B, and is a flow diagram showing steps in receiving a voice or media stream in accordance with the preferred embodiment.

As shown in FIG. 3A, an incoming packet is received from the Internet Protocol Network 100. Initially, the receiver is in an initial state where the input is not muted. That is, a state variable within the receiver is set so that encryption detection and further processing can take place. Thus, at step 300 the method checks the state variable to see if it has been set to "muted". As discussed below, if at the end of the process no cipher match has been found between the transmitter and receiver, the state variable is set to "input muted" (step 380 in FIG. 3B) and the receiver discards the packet and waits at step 305 for an external event (i.e. a message from call control) to identify the correct cipher (i.e. an event following the conclusion of the security negotiation that tells the receiver that the original cipher parameters have either changed to something else, or that re-affirms the original cipher parameters).

If the input is not muted, the method determines at step 310 if the received packet is the first in the RTP stream. If not, processing continues using the previously selected (i.e. expected) cipher, at step 315.

If the received packet is the first in the RTP stream (i.e. a "YES" at step 310), the method discriminates between a plurality of ciphers. In the illustrated embodiment, the packet is examined at step 320 to see if it has the proper length to be an encrypted packet that has an appended authentication tag, without resorting to the more time-consuming process of attempting actual decryption. The length determination can by performed using conventional digital signature operations such as hashes. For example, in SRTP (Secure Real-Time Transport Protocol) and other encryption algorithms it is common to encrypt data and add authentication information (e.g. a tag) to the encrypted data. During encryption, the transmitter performs a cryptographic checksum (hash operation) of the encrypted data and appends it to the packet as an authentication tag. The purpose of the authentication tag is to allow the receiver to ensure that the data hasn't been tampered with during transport and that the transmitter is using the same cipher as the receiver. Hence, the receiver determines if the encrypted data is "authentic" and can therefore proceed to decrypt.

The length determination at step 320 is sufficient to discriminate between an encrypted packet with authentication tag and a packet that has no authentication tag, because the authentication tag adds to the length of the data. Since the particular codec is identified in the unencrypted RTP header, there is a priori knowledge of the expected length of the data. As an example, a G711 audio codec specifies data length in multiples of 8 bytes (1 ms of audio). Thus, a typical 20 ms voice packet is expected to be 160 bytes in length. If, at step 320, the receiver detects a 164 byte packet, then it assumes that the packet includes an authentication tag and proceeds with conventional authentication checks at step 325.

Therefore, the length determination at step 320 can discriminate between a packet encrypted with the expected cipher that includes an authorization tag (e.g. AES 128+Auth), and encrypted or unencrypted packets such as a packet encrypted with the expected cipher that omits the authorization tag (e.g. AES128−Auth) or a further (e.g. proprietary) cipher.

If the length determination does not identify the expected cipher with authentication tag at step 320, then the packet is decrypted either in series or parallel by one of the other possible ciphers, as discussed in greater detail below.

A person of skill in the art will understand that the length determination step 320 may be replaced by a full decryption attempt, with authentication, at the sacrifice of speed and therefore the possibility of minor packet play-out delay.

As discussed above, the transmitter device inserts a pattern in the first N packets (where N is an integer of 1 or more), which is codec specific. Typically this pattern represents silence in whatever codec format has been selected in the media negotiation (e.g. silence for audio or a single blank screen for a video codec). The receiving IP device (hereinafter "the receiver") examines those packets at step 330 for silence, which may be either in encrypted or unencrypted form, and makes a cipher selection choice as a result of that determination. In particular, if the specific pattern is detected at step 330, then the transmitter is determined to have sent the stream as unencrypted. The cipher is changed to NULL (non-decryption) at step 335. Thereafter, all following packets are treated as non-encrypted and played out.

Figure 3B:
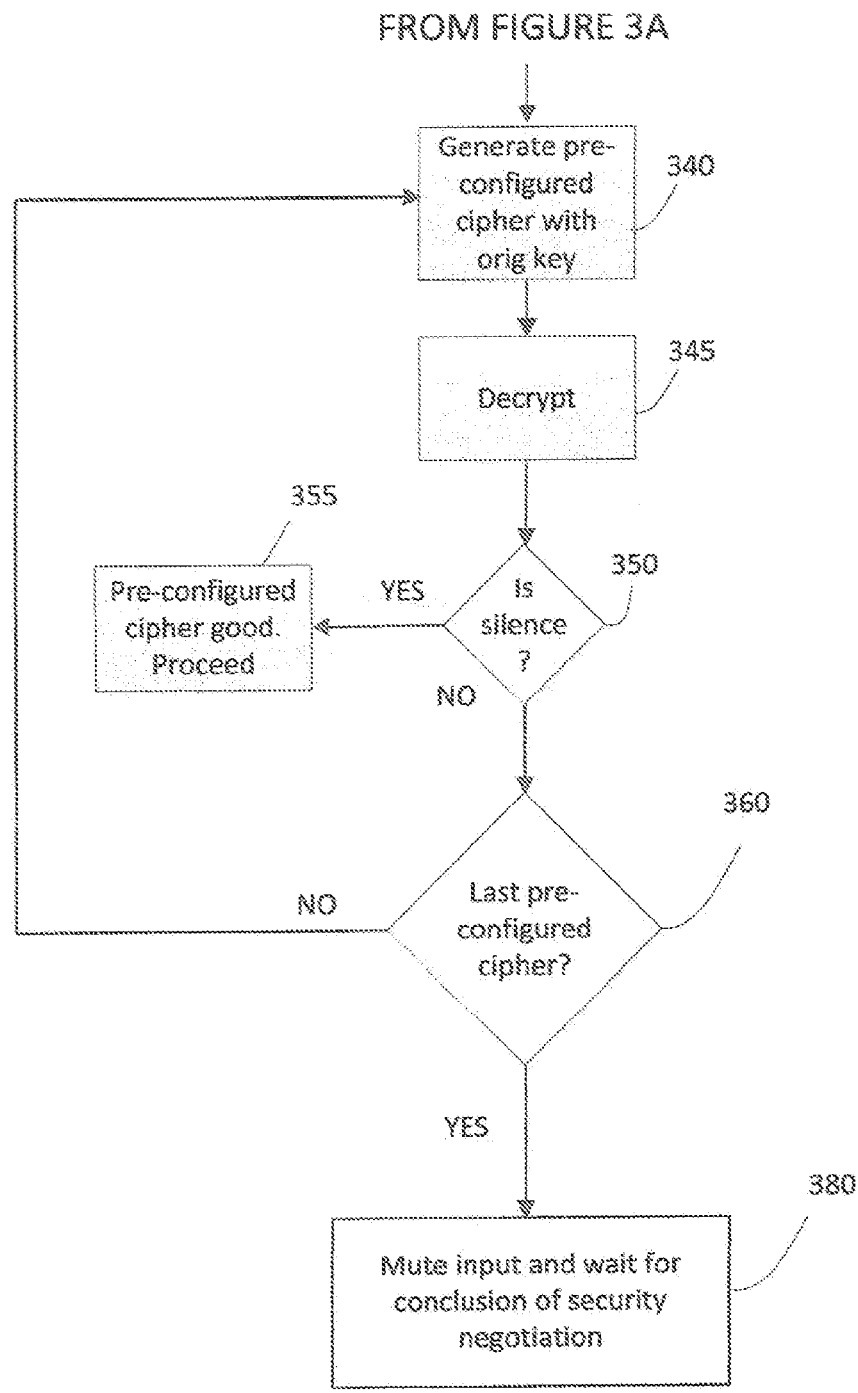

Turning to FIG. 3B, if the specific pattern is not detected within the first received packet at step 330 then the receiver generates the next pre-configured cipher at step 340, and the first packet is decrypted at step 345 using the next pre-configured cipher. In terms of implementation, the decrypted packet is stored in a temporary buffer within the receiver so that the original packet remains unchanged in the event of further processing to detect additional ciphers (e.g. step 360, below).

In one embodiment, the next pre-configured cipher is the expected (i.e. $1^{st}$) cipher but without authentication tag (i.e. AES128–Auth). For example, in some environments (e.g. media gateways) handling very large numbers of RTP streams, it may be desirable for the transmitter to omit sending the authentication information in order to save on CPU cycles.

At step 350, silence detection is performed as in step 330 by detecting presence of the specific pattern generated by the transmitter. If the specific pattern is detected at step 350, then the cipher is changed at step 355 to NULL (non-decryption), as discussed above in connection with step 335.

The process continues according to the steps described above until a matching cipher is found or the list is exhausted (i.e. a YES at step 360) whereupon the receiver discards the packet, the input is muted (i.e. the state variable is changed to "muted") and the receiver waits for an external event indicating conclusion of the security negotiation, as discussed above with reference to step 305, following which encrypted communication takes place in the conventional manner.

A person of skill in the art will understand that additional ($4^{th}$, $5^{th}$, $6^{th}$, etc.) cipher checking steps can be checked by repeating the method steps 340-355 by branching at step 360. For example, additional steps may be added to check for additional cipher classes (e.g. F8 cipher, etc.)

A person of skill in the art will also understand that steps 340-355 and steps 360-375 may be performed in parallel rather than in series. Indeed, it is contemplated that in certain embodiments, the cipher testing steps set forth above may consist of a single test or a decision tree of tests or similar arrangement of multiple tests.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. For example, although the exemplary embodiment has been disclosed in the context of audio codes, other media steams are contemplated. Also, whereas the cipher detection process described above is performed using the first packet of the received RTP stream, in other embodiments the process may be repeated indefinitely on subsequent packets or until stopped by some other means. Accordingly, it is not intended that the invention be limited, except as by the claims set forth below.

What is claimed is:

1. A method of providing in-band early encryption detection within a packet data network, the method comprising the following steps:
   i) transmitting, at a transmitter device of said packet data network, a plurality of data packets;
   ii) receiving, at a receiver device of said packet data network, said plurality of data packets;
   iii) determining, at said receiver, whether at least one of said data packets includes a predetermined pattern inserted into said packet at said transmitter of said packet data network, and upon finding said predetermined pattern in said at least one of said data packets, determining that said data packets are unencrypted, and otherwise:
   iv) decrypting said packet with one of a plurality of pre-configured ciphers, further determining whether said decrypted packet includes said predetermined pattern, and upon finding said predetermined pattern in said decrypted packet, determining that said data packets are encrypted and that the pre-configured cipher at the receiver matches a cipher at the transmitter, and decrypting subsequent packets with said pre-configured cipher prior to delivering said decrypted data packets; and
   v) in the event the predetermined pattern is not found performing step iv) for each remaining one of said plurality of pre-configured ciphers until no pre-configured ciphers remain whereupon said packet is discarded and security negotiations ensue between the transmitter and the receiver.

2. The method of claim 1 wherein step v) is performed sequentially for each of said pre-configured ciphers.

3. The method of claim 1 wherein step v) is performed simultaneously for each of said pre-configured ciphers.

4. The method of claim 1 wherein said predetermined pattern is a series of zeros.

5. The method of claim 1, further including a step iiia) prior to step iii), wherein step iiia) comprises examining the length of said at least one of said data packets for presence of authorization information and if said examination indicates the presence of authentication information then decrypting the pre-configured cipher.

6. The method of claim 1, wherein step v) is performed according to a decision tree.

7. The method of claim 1, wherein said data packets are voice packets.

8. The method of claim 1, wherein said at least one of said data packets is a first one of said plurality of data packets.

9. The method of claim 1, wherein said least one of said data packets comprises successive ones of said plurality of data packets for each performance of step v).

10. A communication system for providing in-band early encryption detection within a packet data network, comprising:
    i) a transmitter in said packet data network for transmitting a plurality of data packets;
    ii) a receiver in said packet data network for
       a) receiving said plurality of data packets;
       b) determining whether at least one of said data packets includes a predetermined pattern inserted into said packet at said transmitter, and upon finding said predetermined pattern in said at least one of said data packets, determining that said data packets are unencrypted, and otherwise c) decrypting said packet with one of a plurality of pre-configured ciphers, further determining whether said decrypted packet includes said predetermined pattern, and upon finding said predetermined pattern in said decrypted packet, determining that said data packets are encrypted and that the pre-configured cipher matches a cipher at the transmitter, and decrypting subsequent packets with said pre-configured cipher prior to delivering said decrypted data packets; and d) in the event the predetermined pattern is not found performing step c) for each remaining one of said plurality of pre-configured ciphers until no pre-configured ciphers remain whereupon said packet is discarded and security negotiations ensue between the transmitter and the receiver.

11. The communication system of claim 10, wherein said receiver performs step d) sequentially for each of said pre-configured ciphers.

12. The communication system of claim 10 wherein said receiver performs step d) simultaneously for each of said pre-configured ciphers.

13. The communication system of claim 10, wherein said predetermined pattern is a series of zeros.

14. The communication system of claim 10, wherein said receiver examines the length of said at least one of said data packets for presence of authorization information prior to step c), and if said examination indicates the presence of authentication information then decrypting the pre-configured cipher.

15. The communication system of claim 10, wherein step d) is performed according to a decision tree.

16. The communication system of claim 10, wherein said data packets are voice packets.

17. The communication system of claim 10, wherein said at least one of said data packets is a first one of said plurality of data packets.

18. The communication system of claim 10, wherein said at least one of said data packets comprises successive ones of said plurality of data packets for each performance of step d).

* * * * *